B. HOLT.
HARVESTER.
APPLICATION FILED JAN. 27, 1913.

1,182,484.

Patented May 9, 1916.
2 SHEETS—SHEET 1.

Inventor
Benjamin Holt
by H. W. Strong
his Atty.

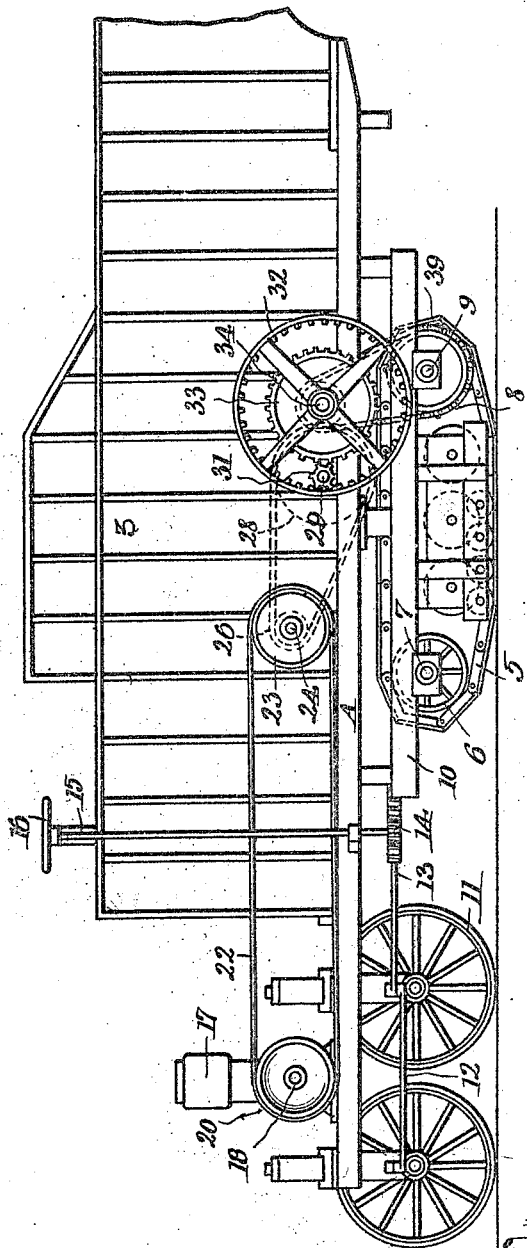

UNITED STATES PATENT OFFICE.

BENJAMIN HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

HARVESTER.

1,182,484.  Specification of Letters Patent.  Patented May 9, 1916.

Application filed January 27, 1913. Serial No. 744,533.

*To all whom it may concern:*

Be it known that I, BENJAMIN HOLT, a citizen of the United States, residing at Stockton, in the county of San Joaquin and State of California, have invented new and useful Improvements in Harvesters, of which the following is a specification.

This invention relates to traveling harvesters and particularly pertains to self-propelled harvesters using an endless, flexible, self-laying track or traction member.

In combined harvesters of the type shown, for instance, in my prior Patent No. 954,394, dated April 5, 1910, it is sometimes desired to operate the machine as a stationary thresher, and again it is often desired, when the machine is operated as a traveling harvester, to run the machine at different speeds according to the character of the grain being operated in. Thus in operating in heavy down grain it is sometimes necessary to travel at slow speed or even to stop the machine without stopping the threshing mechanism, or to back-up the machine without stopping the threshing mechanism so as not to clog the machine. At other times, when operating in very thin grain, it is advantageous to travel faster; yet at all times it is necessary that the cylinder and threshing mechanism be operated at uniform speed in the same direction.

The present invention has reference particularly to the accomplishment of these desired objects by a novel form of power transmission.

The invention consists of the parts and the construction and combination of parts as hereinafter more fully described and claimed, having reference to the accompanying drawings, in which—

Figure 1:
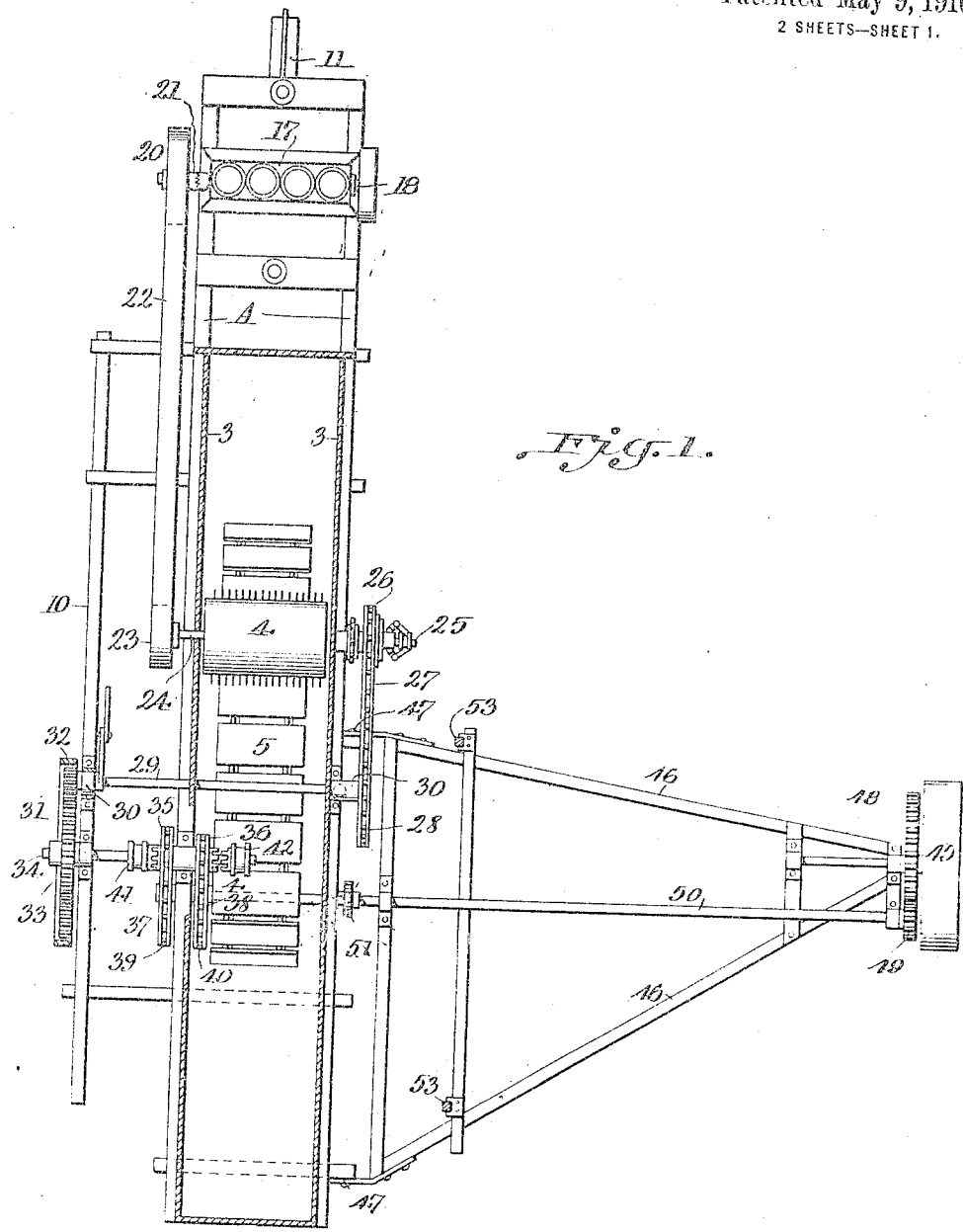
Figure 3:
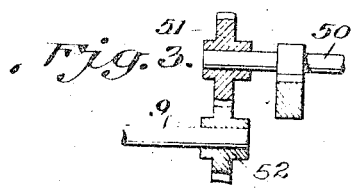

Figure 1 is a plan view of a harvester representing the invention; the cutting mechanism and draper being omitted. Fig. 2 is a side elevation illustrating the invention. Fig. 3 is a detail section of the side bearing transmission gear.

A is the main frame of a traveling harvester and consists of suitable longitudinally extending beams or sills, upon which is mounted the housing 3 containing the separating and threshing mechanism, of which I have shown only the threshing cylinder 4. The load of the superstructure is mainly supported upon a single, endless, traveling, flexible traction member or belt 5 running around a front idler sprocket wheel 6 on shaft 7 and driven by a rear sprocket wheel 8 on a shaft 9. The shafts 7—9 are journaled upon a sub-frame 10, secured to and just below the main frame A.

11 are suitable steering wheels for the harvester, which are provided with a link rod 12 and a connecting-rod 13, operatively engaged by a pinion 14, on a steering shaft 15, which extends upwardly and has a steering wheel 16 within convenient reach of the operator of the harvester.

The present invention relates to a special form of transmission whereby the endless traction belt 5 can be driven in a forward or reverse direction and two speeds in either direction from a motor of suitable type, represented at 17, and mounted on the forward part of the frame A with its shaft 18 extending crosswise of the harvester.

20 is a pulley normally running loose on the engine shaft 18, but capable of being operatively connected thereto by a clutch 21. From the pulley wheel 20 runs a belt 22 which drives a pulley 23, fast on the cylinder shaft 24, on which the cylinder 4 is mounted. The cylinder shaft 24 extends sufficiently beyond each side of the housing 3 to carry at one end the pulley wheel 23 and on the opposite end a clutch 25 operatively engageable with a sprocket wheel 26, normally loose on the shaft 24, and from which sprocket 26 runs a sprocket chain 27 to drive a sprocket wheel 28 fastened on a counter-shaft 29. This countershaft 29 extends across and through the harvester frame and has its opposite end mounted in a shiftable bearing 30 on one of the side sills of the frame A. The bearing 30 is movable fore and aft to carry the pinion 31 on shaft 29 into engagement with one or the other of the concentric gears 32—33 on shaft 34. The end of the oscillating countershaft 29, adjacent to the sprocket 28, is mounted in a swivel bearing 30', permitting the end of shaft 29 carrying the pinion 31 to be swung in one direction or the other.

Loosely mounted upon the short shaft 34 are the respective large and small sprocket wheels 35 and 36, from which are driven respective sprocket chains 37—38 which engage and drive sprocket wheels 39 and 40, of suitable diameters, secured on the driving shaft 9. From shaft 9 the machine is propelled forward or backward or at fast or slow speed without even varying the speed of the cylinder 4.

In operation, if the harvester is to be propelled forward, power is transmitted from the engine 11 and the driving pulley 20, belt 22 and pulley 23 to the cylinder shaft 24. The operator by moving the clutch 25 in one direction couples the sprocket 26 so as to transmit power by the chain 27 to the countershaft 29; and then by shifting the pinion 31 on the shaft into driving mesh with the internal gear 32 the shaft 34 is driven. Movement of the clutch 25 in the reverse direction uncouples the driving connection for the traction gearing but the cylinder and separating machinery continues to operate.

For determining the speed of progression of the harvester, the operator may couple one or the other of the loose sprockets 35—36 to shaft 34; this being accomplished by the shifting into mesh with the desired sprocket one or the other of suitable clutches 41, engageable with sprocket 35, or clutch 42, engageable with sprocket 36. These sprockets being of different diameters will consequently drive the belt-driving shaft 9 at different speeds. When the harvester is to be driven backwardly, the operator simply has to shift the pinion 31 into mesh with the spur gear 33 which will drive the shaft 34 in a reverse direction than would the internal gear 32.

Power is transmitted to the side bearing wheel 45 of the header frame 46 (which latter is pivotally connected at 47 to main frame A), by the following means: To wheel 45 is secured a gear 48, meshing with a pinion 49 fast on a transversely extending shaft 50, journaled on the header frame 46, and carrying at its inner end a gear 51 having a rolling or pivotal engagement with a pinion 52 on the adjacent end of the driver shaft 9. The driver shaft 9 is in a plane below the plane of the header pivots 47, and when the header frame is tilted about the pivots by suitable means, not here shown but indicated in part at 53, the pinion 51 on the header shaft 50 will rock while in mesh with the driving pinion 52 on the shaft 9.

Having thus described my invention, what I claim and desire to secure by Letters Patent is—

1. In a harvester, the combination of a main frame having separating mechanism thereon, said separating mechanism including a threshing cylinder positioned forwardly on the main frame and driven at a uniform rate of speed, a motor on the main frame in front of the threshing cylinder, an endless flexible driving tractor mounted behind said cylinder and supporting the main frame, and a single direct drive connection from the motor through the cylinder directly to the tractor, with means whereby the tractor may be operated at multiple speeds forward or reverse without varying the speed or direction of rotation of the thresher cylinder.

2. In a harvester, the combination of a main frame, a motor positioned forwardly on the main frame, separating mechanism on said frame including a thresher cylinder positioned behind the motor, a thresher cylinder shaft, a drive connection between the motor and said shaft for driving the thresher cylinder at a uniform rate of speed, an endless flexible driving tractor mounted behind the thresher cylinder and supporting the main frame, and driving connections between the cylinder shaft and the tractor for driving the latter at multiple speeds forward or reverse without varying the speed or direction of rotation of the thresher cylinder, substantially as described.

In testimony whereof I have hereunto set my hand in the presence of two subscribing witnesses.

BENJAMIN HOLT.

Witnesses:
R. E. MANN,
C. G. MOORE.